July 28, 1964  H. R. JAQUITH ETAL  3,142,312
CONTROL INSTRUMENTS

Original Filed July 21, 1958  2 Sheets-Sheet 1

INVENTOR.
Howard R. Jaquith
J. Philip Hurdle
BY
P. J. Young, Jr.

July 28, 1964  H. R. JAQUITH ETAL  3,142,312
CONTROL INSTRUMENTS

Original Filed July 21, 1958  2 Sheets-Sheet 2

INVENTOR.
Howard R. Jaquith
J. Philip Hurdle
BY

United States Patent Office

3,142,312
Patented July 28, 1964

1

3,142,312
CONTROL INSTRUMENTS
Howard R. Jaquith, Rochester, and Junius Philip Hurdle, Fairport, N.Y., assignors to Taylor Instrument Companies, Rochester, N.Y., a corporation of New York
Original application July 21, 1958, Ser. No. 749,987, now Patent No. 3,025,868, dated Mar. 20, 1962. Divided and this application July 10, 1961, Ser. No. 123,067
3 Claims. (Cl. 137—557)

This invention relates to improvements in instrumentalities useful in process control systems and is a division of our application S.N. 749,987, filed July 21, 1958, entitled Control System and now U.S. Letters Patent 3,025,868, issued March 20, 1962.

In our patented application it is disclosed that it is advantageous to have an adjustable set point transmitter of the type wherein the set point signal produced by the transmitter is indicated as a direct function of the amount of adjustment in the form of knob rotation or other movements applied to the transmitter for the purpose of causing the transmitter to provide a selected value of set point signal.

The control system disclosed in the said patented application therefore requires a set point transmitter that is, mechanically speaking, a precision-type instrument. It is hence advantageous to limit somehow the amount of adjustment that can be applied to the mechanism of the instrument in order to avoid derangement thereof due to over-ranging in adjusting the set point.

It is also advantageous to provide a releasable coupling through which adjusting motion is applied to a set point indicating means forming a part of the transmitter, since the indicating means, according to the usual convention is generally scaled to cover only a part of the total range of set point signal that the transmitter can provide. For example, in the case of pneumatic instrumentation, the indicated set point range may be 3–15 p.s.i., whereas the actual available range of set point pressure adjustment may be 0–20 p.s.i. Since the output signal of the set point transmitter is sometimes used directly to position a valve or other control element as well as to provide a set point signal for a controller that is alternately used to position the said valve, the larger range of signal will sometimes be useful.

For a more detailed discussion of considerations involved in the use of the present invention in control systems, reference must be had to the aforesaid patented application.

In the light of the foregoing, it will be seen that the general object of this application is to provide novel improvements in set point transmitters.

Figure 1:
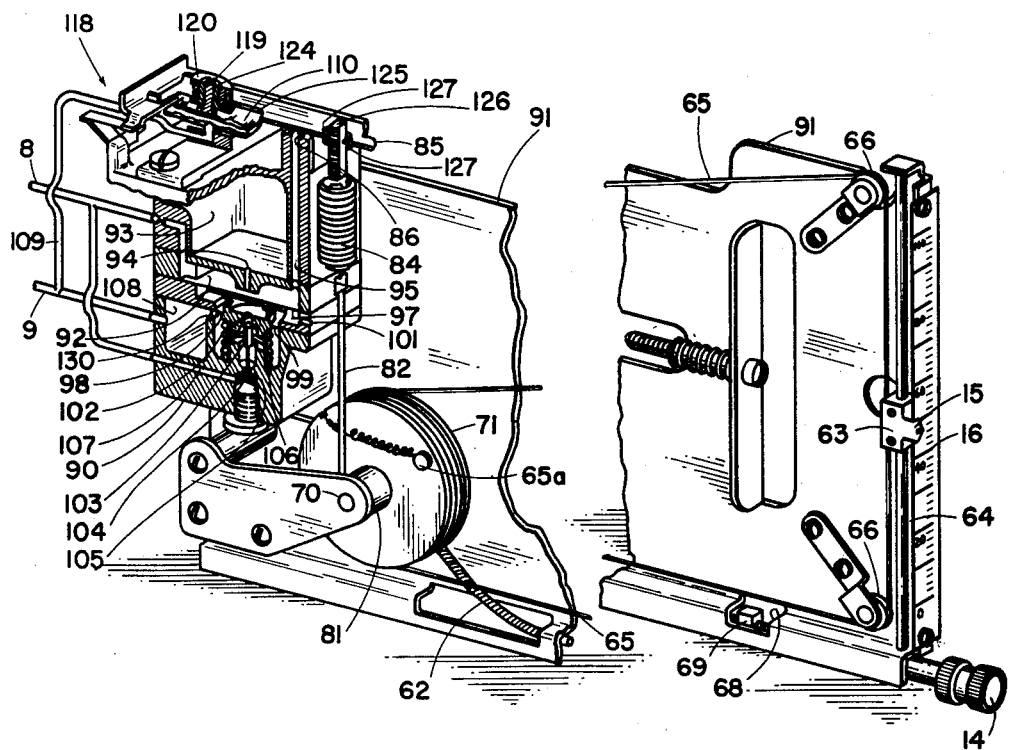
Figure 2:
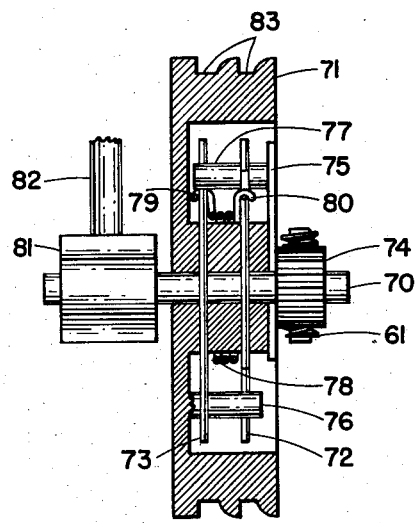
Figure 3:
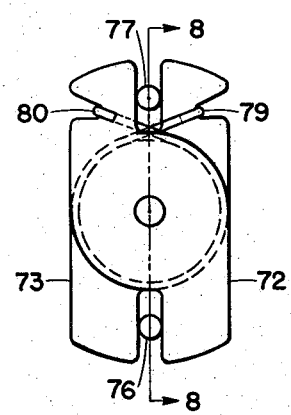

Having reference now to the drawings appended hereto:
FIGURE 1 is a view of the novel set point transmitter;
FIGURES 2 and 3 are detail views revealing various features of a releasable coupling utilized in the transmitter of FIGURE 1.

In FIGURE 1, chambered body 90, comprising the major portion of the regulator proper, is mounted on a slide 91, which slide also supports scale 16, pointer 15 and an associated pointer driving mechanism, and knob 14 with the mechanism associated therewith to set the regulator and to position pointer 15, the slide and all thereon constituting the transmitter T.

Connection 8 supplies the body 90 with air at about 20 p.s.i. or more, and connector 9 is adapted to be loaded with some capacity such as a process control valve motor, the set point bellows of a pneumatic controller, or the like, to be supplied with a pressure corresponding to the setting of knob 14.

Air admitted at connection 8 moves first to a chamber 92 from whence part moves into the nozzle connection 95 and part into closed chamber 93 via passage 94, air eventually escaping to the outer atmosphere via the space between baffle 85 and nozzle 86. The bottom of the chamber 92 is closed by a diaphragm 97 carrying a valve cage 98, said cage also being supported by a further diaphragm 99 and biased upwardly by a spring 106. Diaphragms 97 and 99 hence are movable in unison and define a bleed chamber connected to atmosphere by vent 101. The valve cage is centrally apertured at 102 to provide a valve seat for valve needle 103. At its lower end, needle 103 terminates in a valve plug 104, and a seat 105 is provided in body 90. Plug 104 and seat 105 control communication between a passage 107 in body 90 and a chamber 108. Connection 107 communicates connection 8 with the space between the seats of the valve plug and needle, when plug 104 is unseated, and the said space communicates at all times with chamber 108 via port 130, and with the connection 9 terminating in chamber 108. Connection 9 also has a feedback connection via connection 109 to capsule 110 fixed to body 90, so that as pressure is admitted to or drawn from capsule 110, a threaded stud 119 moves respectively upwardly or downwardly on a flexible wall portion of said capsule. Stud 119 passes through a slot 125 in baffle 85, and is secured thereto by a threaded connector comprising a flanged, exteriorly and interiorly threaded hollow nut 124 which is threaded onto stud 119, and an internally threaded nut 120 threaded on nut 124, so that the baffle is gripped between the flange of nut 124 and nut 120. The threading arrangement and the slot, of course, permit the stud 119 and baffle 85 to be adjustably fixed to one another to vary motion transmitting relations, to accommodate varying dimensions of parts at assembly, etc. A spring strip fulcrum generally indicated at 118 permits the baffle 85 to be deflected about an axis fixed with respect to body 90.

Since the foregoing describes a regulator structure of a type familiar to those skilled in the art, it is unnecessary to describe its behavior in detail.

Briefly, however, if air is supplied to connection 8 and connection 9 is loaded by some device such as a bellows, or other fluid capacity (not shown), the pressure in said bellows will be increased or decreased respectively as baffle 85 is moved respectively up or down, as by a spring 84. Thus, if spring 84 is tensioned baffle 85 is pulled closer to nozzle 86, which results in an increase in pressure in chamber 92. Hence, cage 98 moves down to move plug 104 away from seat 105, and this results in increased pressure on the bottom of diaphragm 99 and in capsule 110, so that baffle 85 is moved away from nozzle 86. The net result, of course, is that the moment of spring 84 about the axis of baffle deflection is balanced by the moment of capsule 110 about said axis. Therefore, the pressure in line 9 and the load thereon is a function of the tension in spring 84.

In practice, the air supply for connection 8 may be any suitable means for furnishing clean dry air under a more or less fixed pressure which, while it need not be closely regulated, should be at least as great as the maximum pressure it is desired to establish in the aforesaid load, e.g., set point bellows 23 of the pneumatic controller disclosed in our above-identified patented application. Also, chamber 108 may be supplied with a slight bleed (not shown) to atmosphere, in order to keep plug 104 from actually seating in seat 105 when the moments on baffle 85 are balanced. As will be apparent to one skilled in the art, this practice will prevent a dead zone from occurring in the operation of the regulator when the tension of spring 84 is changed from a value at which the baffle-nozzle spacing is such as to maintain balance bentween spring 84 and capsule 110.

Obviously, for any position of baffle 85 in the throttling range of nozzle 86, there will be a corresponding pressure output, hence if forces corresponding to those positions are applied to the baffle via a force exerting device such as spring 84, the spring tension may be taken as a measure of the output of the regulator into an appropriate load. As is well known, under these conditions of operation, movements of the baffle will be so small that the regulator operation per se will be sufficiently linear that the pressure output of the regulator can be considered to be as linear as the spring 84.

Accordingly, we arrange an accurately-calibrated linear spring 84, adjustably secured to the baffle by a threaded spring support 126 and a pair of nuts 127 between which the baffle end is gripped, to apply force to baffle 85. By "accurately calibrated" we mean the spring constant of spring 84 is actually constant throughout the range of spring-tension corresponding to the range of regulator output pressure from minimum to maximum and vice versa. Such springs are old in the art, at least to the extent that springs are readily obtainable that conform to a linear characteristic as closely as required for our purpose.

To drive the spring 84 and the pointer 15, there is provided a compound pulley consisting of pulleys 71 and 81 (FIGURES 1 and 2), which for the moment may be considered fixed to shaft 70, shaft 70 being rotatably supported on slide 91 in any convenient manner so as to permit the pulleys to rotate with respect to the axis of the shaft 70 as a fixed axis.

A pinion 74 is provided to drive shaft 70 and pulleys 71 and 81, and a worm 61, rotated by a flexible shaft 62, drives the pinion 74 when the shaft 62 is rotated by knob 14 secured to the end of shaft 62.

To drive the pointer, a flexible element 65 having a block 63 guided vertically on a post 64 parallel to scale 16 and fixed to an intermediate portion of said flexible element 65, is provided having its end-portions wrapping around pulley 71, each end-portion lying in one of pulley grooves 83 and being wrapped around the pulley in a direction opposite to the direction of wrapping of its fellow end-portion. Each end of element 65 is secured to pulley 81 by posts 65a or equivalent, one such post being shown. The element 65 is guided by pulleys 66 rotatably mounted on slide 91 and constraining the element section therebetween to a straight line path parallel to post 64 and the desired line of travel of pointer 15, which is supported on block 63.

Element 65 is made to fit slacklessly when the parts are assembled as shown in FIGURE 1.

A flexible element 82 is also provided for driving spring 84 and is secured at one end to the spring and at the other end to pulley 81.

In operation, if knob 14 is turned, the end-portion of element 65 in one of grooves 83 will unwrap from the pulley 71 while the other end-portion of the element 65 will wrap up on pulley 71 in its groove. Simultaneously, flexible element 82 also wraps on or unwraps from pulley 81, stretching or slacking spring 84 depending on which way knob 14 is turned.

Obviously, scale 16, relative diameters of pulleys 71 and 81, dimensions of regulator parts, and so on, are so proportioned that the position of knob 14, hence of index 15 on scale 16, is an indication of transmitter output pressure.

It is conventional practice to make the range of 3–15 p.s.i. the pressure range equivalent of full scale output of process variable transmitters and of full scale gage indications; and since the scale indications are essential guides in manipulating the control circuitry in the various types of service, it is convenient to make the indicated pressure ranges in terms of actual scale length (i.e., inches, cm., etc.) identical, to wit, 3–15 p.s.i., irrespective of the names or divisions of scale units, since in this way, coincidence of pointer position, as when determining if nominal set point and the actual control point of a process under control are identical or not, eliminates actual scale readings, as more particularly described in our above-identified patent.

The set point transmitter indication is no exception to this convention, and, hence, the transmitter scale will be identical in length and will correspond to 3–15 p.s.i. output for full scale movement of pointer 15.

However, it is often convenient to have a larger range of transmitter pressure available, say 0–20 p.s.i. One reason for this is that while many of the system components may be 3–15 p.s.i. devices, the control valve, or the like, which may be the ultimate load on the transmitter, may have a useful range of operation over a larger pressure range than 3–15 p.s.i. and it may sometimes be desirable to operate the valve by pressures in the larger range but outside the smaller range.

Limitations as to scale length, scale readability, uniformity relative to the receiver scales, etc., in an instrument design such as shown in FIGURE 3 of our above-identified patent bar obvious solutions, such as causing index 15 to move over a 0–20 p.s.i. scale, to the problem of providing the larger range.

According to the invention, we obtain an equivalent result by constituting the transmitter T so that knob 14 can decrease the minimum output of the pressure regulator below that allowed for by scale 16 and, if desired, also increase transmitter output above the maximum indicated by scale 16. In other words, the pressure regulator may be adjusted by knob 14 to produce pressures that may be lesser or greater than those corresponding to the most extreme readings on scale 16 (i.e., 0 and 100, the illustrated minimum and maximum of scale 16).

This result is achieved by releasably coupling pulley 71 to shaft 70, so that if pulley 81, shaft 70 and pinion 74 are rigidly coupled together, pulley 71 can be decoupled from shaft 70 when block 63 reaches a limit of travel, say an extreme of guide post 64, and the slacking or stretching of spring 84 can be continued by further rotation of knob 14 beyond the point where block 63 is halted, in order to drive the regulator out of the 3–15 p.s.i. range.

Hence, we couple pulley 71 to shaft 70 by means of what may be termed a scissors coupling, spring-biased to maintain a positive coupling unless the torque exerted by knob 14 surpasses a given maximum when block 63 is halted at an extreme of its travel.

Referring now to FIGURES 2 and 3 pulley 71, half-scissors 72 and half-scissors 73 are each mounted concentrically of shaft 70, and, except for the presence of studs or pins 76 and 77 and spring 78, would be rotatable freely and independently of the other elements. However, the scissors halves 72, 73 are drawn together by spring 78, the ends of which, hooks 79 and 80, are forcibly spread apart and hooked over the scissors. As is evident from FIGURE 2, spring 78 fits around the hub of pulley 71 with some clearance. The clearance should be sufficient to permit the spring to wind-up enough to allow the scissors to open a substantial amount. By proper dimensioning of studs 76 and 77, the angles subtended by the scissors, and so on, the scissors halves will grip both stud 76 and 77 as indicated in FIGURE 3. Under these circumstances, should gear 74 be turned, arm 75 and stud 77 will necessarily follow, since shaft 70, gear 74, arm 75 and stud 77 are to all intents and purposes integral. In consequence, one of the half-scissors, which one depending on direction of gear rotation, will be pushed by the stud 77, and would lift its other end off stud 76, except that spring 78 opposes motion of the half-scissors, and transmits a force to the other half-scissors which is applied to said other half-scissors by one of the spring hooks in the same direction as that in which stud 77 pushes the said one of said half-scissors. The said other half-scissors is caused to push against pin 76 and, hence, move pulley 71 to which pin 76 is fixed, or of which said pin 76 forms a part.

Suppose now, during this motion of pulley 71, that the pulley is stopped, but torque is still applied to gear 74. In such case, spring 78 is stressed till it begins to wind up, i.e., the ends 79 and 80 are forced further apart, and the half-scissors which is being directly pushed against by stud 77, actually lifts its other end off stud 76, whereas the remaining half-scissors, stopped by immobile stud 76, holds one end of spring 78 in fixed position.

Finally, after having wound-up spring 78 a little by continuing the initial motion after pulley 71 has stopped, if motion of gear 74 is reversed the scissors will again eventually close on the studs. Pulley 71 will remain unmoved until said studs are closed on by the scissors and, if the reverse motion is continued, will reverse the rotation of the pulley and, if the pulley is again stopped, open the scissors again. For "reverse" motion, the description of operation would begin with stud 77 pushing against what was termed supra the "other" of said half-scissors, and so on. Obviously, with the full scissors, the operation of the clutch is fully reversible.

To absolutely limit the amount of rotation of knob 14, in order to obviate needless off-scale rotation of knob 14 to points outside of the actual pressure output range of the transmitter, say, 0–20 p.s.i., in this case, a portion of shaft 62 is externally threaded and has an internally threaded block 69 thereon that projects into an aperture 68 in slide 91, the block being located sufficiently close to one side of the aperture to prevent it from rotating with shaft 62 when knob 14 is turned in either direction. On the other hand, block 69 is spaced from opposite ends of the aperture 68 so as to prevent the block from threading along shaft 62 (which shaft is mounted in fixed bearings, of course, whereby it rotates in situ) beyond limits defined by the said ends of the aperture, the distance between said ends corresponding to the effective range of transmitter output, e.g., 0.20 p.s.i.

When the parts are assembled initially, naturally, block 69 should be centered between the ends of aperture 68, with the median value of pressure output existing when pointer 15 is centered on scale 16, assuming the scale to be linear, which it will be in this case. Hence, when block 69 has threaded along the shaft far enough to come into contact with one end of the aperture, one extreme of off-scale pressure output is reached, and knob 14 cannot be further turned except to back block 69 off from said one end toward the remaining aperture-end, and the other off-scale extreme output.

Just as block 69 and aperture 68 prevent useless and possibly damaging overranging of the regulator mechanism, they serve also to prevent overranging of the scissors mechanism, which is inherently limited as to the amount of knob rotation it will absorb, and, hence, if overranged too far, may be damaged and/or begin to transmit force to the stopped index-moving element 63 so as to jam same, or produce some deleterious effect on that structure which would feel the effect of force exerted via element 65.

The overrange prevention function relative to transmitter T as a whole is not the only result afforded by block 69. The opposite ends of aperture 68 which limit block motion along the shaft 62 correspond to the limits of pressure regulator output, say zero p.s.i. and 20 p.s.i., respectively, and whatever the indicia of scale 16 may be, the said extreme indicia on the scale correspond to 3 p.s.i. and 15 p.s.i., respectively. Therefore, if the transmitter is being used to position a control valve, say in "manual" service as described in the aforesaid patented application, transmitter T is in effect self-indicating even for off-scale pressure outputs, since each successive third, say, of the amount of rotation left knob between minimum scale reading and abutting of block 69 on the end of aperture 68 setting minimum output, corresponds to a decrement of 1 p.s.i. Hence, a setting of one or two thirds of said amount means that the transmitter output is one or two p.s.i. Likewise, it is obvious that if after pointer 15 has attained the maximum scale position, and knob 14 is turned half the remaining angular distance permitted by block 69, that the pressure output is approximately 17.5 p.s.i., and therefore that the control valve has assumed a corresponding position.

Such fractions of knob turning represent various decrements and increments of regulator output to be added to the nominal output indicated by pointer 15. Such decrements and increments are zero, of course, whenever output is within the indicated range on scale 16. Hence, output is always that corresponding to the indication plus a decrement or increment, given by the amount knob 14 has moved in that portion of its range that is outside the range of indication on scale 16. The value of the decrement, or increment, is easily appreciated by eye, as will be evident from the inherent relationship among the various moving parts of the transmitter.

It is clear from the foregoing that the general proposition that transmitter T be self-indicating is not modified by the fact that effective pressure output range of transmitter T is larger than the range of scale 15, since the block 69 and aperture 68, in their function as overrange prevention also cooperate to extend, in effect, the scale 15 such that substantially the entire range of transmitter output is still readily determined without recourse to use of an additional component, such as a pressure gauge.

Having described herein our invention in the best form known to us at this time, and its uses, we claim:

1. A self-indicating pressure transmitter comprising a pressure regulator having an element movable in a given range to change regulator output, an indicating mechanism having a range of indication corresponding in its entirety to a portion only of said given range, actuating means for actuating said indicating mechanism and said element so that the extent of movement of said element is indicated by said indicating mechanism to the extent that the position of said element lies within said range of indication, overrange prevention means coupling said actuating means to said indicating mechanism and adapted to decouple said indicating mechanism from said actuating means when said indicating mechanism indicates a most extreme value of its range of indication, said element being positively coupled to said actuating means at all times, and stop means preventing movement of said element from positions within said given range to positions outside of said given range, whereby the transmitter output is represented by the value of an indication in the said range of indication, and the extent said element has moved in that portion of its said given range of movement that is outside the said range of indication.

2. The invention of claim 1, wherein said overrange prevention means is provided in the form of a rotary motion transmitting assembly adapted to transmit rotary motion to a device to the extent that said device does not react to said motion to cause a torque reaction in said assembly greater than a predetermined value, said assembly comprising, in combination, first and second rotary means mounted for rotation independently of each other, said first means having mounted thereon a pair of rotary elements capable of rotation with respect to said first means and to each other, both of said elements and both of said rotary means having a common rotary axis and being arranged seriatim along said axis; each said element having spaced radial portions, and each of said rotary means having pin means extending in the path of a pair of such radial portions; the said pin means and said radial portions being so proportioned as to have each said pair of radial portions located side by side with one of said pin means therebetween and in contact with them; spring means biasing said portions into contact with said pin means, whereby rotary motion of one of said rotary means will be transferred to the other of said rotary means through said spring means unless the said other of said rotary means resists rotation sufficiently to exert a torque reaction greater than the torque that can be applied by said spring means to the said other of said rotary means; one of said rotary means being arranged so that rotation thereof moves said element, and said indicating mechanism indicates the position of said element; said actuating means being arranged so that operation thereof rotates the other of said rotary means.

3. The invention of claim 1, wherein said actuating means includes a member which moves over said given range in correspondence to the movement of said element in said given range; said member having substantial movement appreciable to the eye when its said movement is in a portion of said given range that is outside said range of indication; and said member being located so that its said movement is visible simultaneously with the indications of said indicating mechanism.

References Cited in the file of this patent
UNITED STATES PATENTS

| | | |
|---|---|---|
| 2,051,028 | Crandall | Aug. 18, 1936 |
| 2,521,092 | Pratt | Sept. 2, 1950 |
| 2,569,676 | Kenyon | Oct. 2, 1951 |
| 2,756,610 | Hibbard | July 31, 1956 |
| 2,822,783 | Clifton et al. | Feb. 11, 1958 |
| 2,857,928 | Lerner et al. | Oct. 28, 1958 |
| 2,880,755 | Brown | Apr. 7, 1959 |
| 2,944,438 | Weaver | July 12, 1960 |
| 2,952,266 | Behrens | Sept. 13, 1960 |
| 2,976,885 | Garraway et al. | Mar. 28, 1961 |